No. 637,742.  
A. B. SIMONS.  
BACK PEDALING BRAKE.  
(Application filed Nov. 4, 1898.)  
Patented Nov. 21, 1899.
(No Model.)
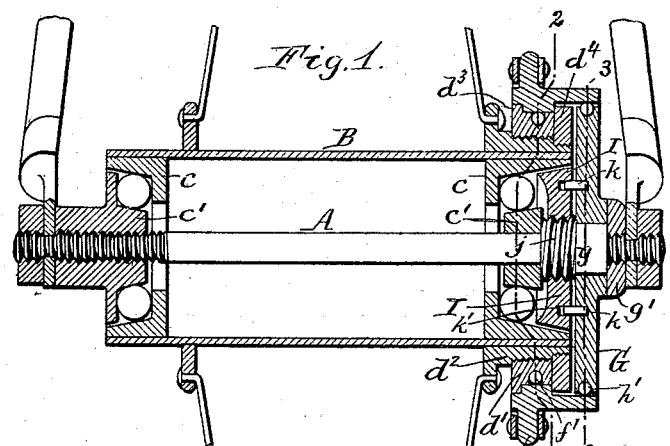
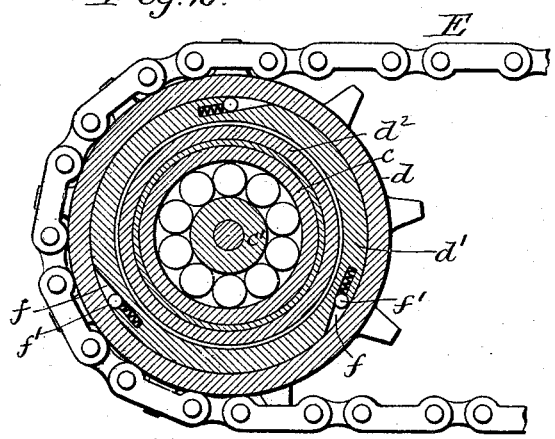
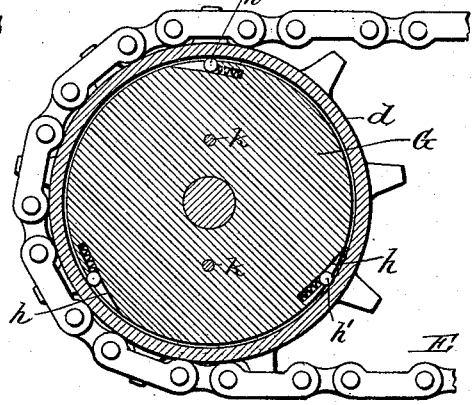
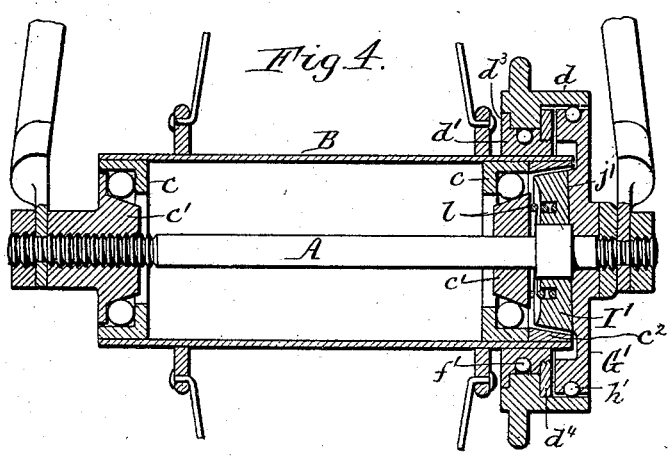
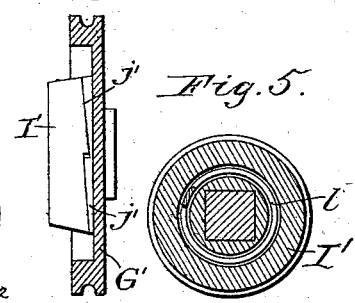
Witnesses:  
Chas. F. Burkhart.  
Henrie L. Deck.
A. B. Simons.  
Inventor.  
By Wilhelm Bonner  
Attorneys.

UNITED STATES PATENT OFFICE.

AL BURT SIMONS, OF BUFFALO, NEW YORK, ASSIGNOR OF ONE-HALF TO FAY M. LA FAYETTE, OF SAME PLACE.

BACK-PEDALING BRAKE.

SPECIFICATION forming part of Letters Patent No. 637,742, dated November 21, 1899.

Application filed November 4, 1898. Serial No. 695,433. (No model.)

*To all whom it may concern:*

Be it known that I, AL BURT SIMONS, a citizen of the United States, residing at Buffalo, in the county of Erie and State of New York, have invented new and useful Improvements in Back-Pedaling Brakes, of which the following is a specification.

This invention relates to the class of velocipede-brakes which are applied by a backward or reverse movement of the driving mechanism and which are commonly termed "back-pedaling brakes," and more especially to brakes which coöperate with the hub of the rear wheel.

The principal object of my invention is the provision of a device of this kind which enables the rider either to coast without removing the feet from the pedals or to retard or stop the machine at will, thus providing the machine with a combined brake and coaster.

The invention has the further objects to produce a simple, compact, and effective brake of the class referred to which is neat in appearance and inexpensive in construction, which does not disturb the alinement of the driving-chain nor increase the ordinary size of the wheel-hub, and which permits the portions of the hub which extend outwardly from the spoke-flanges to be constructed of uniform length for preserving the central arrangement of the hub and enabling the same to be placed in any desired frame.

In the accompanying drawings, Figure 1 is a longitudinal sectional elevation of a rear-wheel hub provided with my improved brake and coaster. Figs. 2 and 3 are transverse sections in lines 2 2 and 3 3, Fig. 1. Fig. 4 is a view similar to Fig. 1, showing a modified construction of the brake. Fig. 5 is a cross-section of the axle and the brake-disk of said modification. Fig. 6 is a detached edge view, partly in section, of the brake and clutch disks of said modified construction.

Like letters of reference refer to like parts in the several figures.

Referring to Figs. 1, 2, and 3, A is the axle of the rear wheel of a bicycle, which is rigidly secured in the lugs of the rear-fork members in a well-known manner, and B is the rotary wheel-hub, which is supported on the axle by ball-bearings of any approved form.

In the construction shown in the drawings the hub is provided in its ends with outwardly-facing ball-cups $c$ and the axle with the usual bearing-cones $c'$.

The sprocket or driving wheel carried by the wheel-hub consists of an outer or sprocket rim $d$ and an inner web or ring $d'$, firmly secured to an externally-screw-threaded collar $d^2$, which in turn is rigidly secured to the wheel-hub, so that the hub and the web $d'$ turn together. This web and collar are preferably engaged by a right-hand screw-thread. The sprocket-rim is mounted loosely on the periphery of the web $d'$ and provided on its inner side with an annular flange, which is confined between a flange $d^3$, projecting outwardly from the inner portion of the web, and a nut $d^4$, applied to the screw-threaded outer portion of the collar $d^2$, the last-named screw-thread being pereferably a left-hand thread.

E is the usual driving-chain, which runs around the sprocket rim or wheel $d$ and a similar wheel mounted on the crank-shaft, which latter is not shown in the drawings. The sprocket-rim is connected with its web by a clutch of any suitable construction, which compels the web and the wheel-hub to turn forwardly with the rim for propelling the machine, but allows the rim to remain at rest in coasting or to turn backward independently of the web and hub for applying the brake, to be hereinafter described. A ball-clutch of the construction shown in the drawings is preferably employed for this purpose, the same consisting of recesses $f$, formed in the periphery of the web $d'$ and having abrupt rear ends and inclined bottoms, and balls $f'$, which are arranged in said recesses and are wedged between the bottoms of the same and the inner face of the sprocket-rim by the forward movement of the latter for compelling the sprocket-rim and the wheel-hub to turn together forwardly, the balls receding into the deep rear portions of the recesses when the sprocket-rim is held stationary by back-pedaling to allow the hub to continue its forward movement independently of the sprocket-rim.

G is a rotary clutch-disk arranged adjacent to that end of the wheel-hub which carries the sprocket-wheel and turning loosely on the axle A. This disk is confined against lateral movement by a shoulder $g$ of the axle and a nut $g'$, applied to the reduced outer portion thereof. The sprocket-rim extends outwardly a sufficient distance to inclose the periphery of the clutch-disk, and this disk is coupled to the sprocket-rim by a suitable clutch, which acts reversely to the coasting-clutch that couples the sprocket-rim to its web, so that the clutch-disk is compelled to turn backward with the sprocket-wheel in back-pedaling, but is unaffected by and does not interfere with the forward movement of the sprocket-wheel. Any suitable clutch may be employed for coupling the disk G to the sprocket-rim; but a ball-clutch similar to the coasting-clutch is preferably used, as shown in the drawings, the recesses $h$, which receive the balls $h'$, being formed in the edge of the clutch-disk and facing in the opposite direction from those of the coasting-clutch, as seen by a comparison of Figs. 2 and 3.

I is a movable brake member or disk surrounding the axle A between the clutch-disk G and the adjacent ball-bearing of the wheel-hub and capable of moving lengthwise of the axle. The brake-disk is provided with a beveled or inwardly-tapering edge adapted to engage with or fit into the correspondingly-beveled bore of the adjacent bearing-cup of the hub or a similar conical ring or surface at the end of the hub, and the brake-disk is so combined with the clutch-disk G that when the latter is turned backward in back-pedaling the brake-disk is moved inwardly in the end of the hub and caused to bear with its beveled edge against the surrounding ball-cup, thereby retarding the forward movement of the hub. The longitudinal movement of the brake-disk is preferably effected by a left-hand screw-thread $j$, formed on the axle and engaging with a corresponding thread in the bore of the brake-disk, and the latter is compelled to turn with the clutch-disk G by one or more horizontal pins $k$, projecting inwardly from the clutch-disk and fitting loosely in sockets or openings $k'$, formed in the opposing side of the brake-disk, so that the pins, while compelling the brake-disk to turn with the clutch-disk, permit the same to move toward and from the clutch-disk under the feeding action of the screw-thread $j$. It is obvious that the arrangement of the pins $k$ and sockets $k'$ might be reversed, the pins being secured to the brake-disk and the sockets formed in the clutch-disk. It will now be understood that as the clutch-disk is confined against lateral movement on the axle and the brake-disk is caused to take part in the rotary movement of the clutch-disk the backward movement of the latter disk causes the brake-disk to be screwed inwardly on the axle, forcing the brake-disk into and against the bearing-cup of the hub and retarding or stopping the machine.

In the normal condition of the parts the brake-disk is in its outer position, where it clears the cup or brake surface of the hub, as shown in Fig. 1. Upon pedaling forwardly in the ordinary way the wheel-hub is caused to turn forwardly with the sprocket-rim by the main or coasting clutch and the brake-disk and the brake-clutch remain at rest. When the rider desires to coast, he simply allows the cranks to remain stationary, when the coasting-clutch permits the driving-chain and the sprocket-rim $d$ to remain at rest and allows the wheel-hub to continue its forward movement within the sprocket-rim. When the rider desires to apply the brake, he back-pedals, by which movement the clutch-disk G and the brake-disk connected therewith are turned backwardly, causing the brake-disk to engage against the cup of the wheel-hub, as hereinbefore described, the brake-disk being wedged more tightly into the cup the greater the backward pressure exerted upon the cranks. When it is desired to throw off the brake, the rider again pedals forwardly. As the brake-disk still remains in engagement with the hub, it takes part in the forward movement of the hub; but as the disk is connected with the axle by a left-hand screw-thread this reverse movement causes the disk to be moved away from the bearing-cup of the hub, thus releasing the latter.

In the modified construction of my invention shown in Figs. 4, 5, and 6 the wheel-hub and the clutch-disk G' are caused to turn in opposite directions with the sprocket-rim by reversely-arranged coasting and brake clutches, as in the first-described construction; but the brake-disk I', instead of being moved toward and from the brake-surface of the hub by a screw-thread, is shifted inwardly by inclines or cam-faces $j'$, formed on the opposing sides of the clutch-disk and the brake-disk. The brake-disk is free to slide on the axle, but is held against turning thereon by making the bore of the disk and the adjacent portion of the axle square or of other angular cross-section, as shown in Fig. 5. The brake-disk is moved outwardly for releasing the hub by a stiff spiral spring $l$, which is interposed between the clutch-disk and the brake-disk and which is compressed upon applying the brake, so that the spring throws off the brake by its reaction when the rider again pedals forwardly. As shown in this modification, a separate conical brake-ring $c^2$ may be used instead of lengthening the right-hand bearing-cup of the hub for this purpose.

In my improved construction the brake and coasting devices are both applied to and combined with the wheel-hub in a neat and compact manner and without increasing the diameter of the hub beyond the ordinary size. The application and release of the brake does not disturb the alinement of the chain, and the compactness of the device renders it unnecessary to extend the hub farther beyond the spoke-flange at the brake end of the hub than at the other, thus centering the hub in the wheel and adapting the same to any frame, while the simplicity of the device renders its cost comparatively small.

I claim as my invention—

1. In a combined coaster and brake, the combination with an axle and a wheel-hub journaled thereon, of a driving-wheel which is held against lateral movement relatively to the wheel-hub, a driving-clutch which compels the hub to turn forwardly with the driving-wheel but allows the latter to turn backwardly independently of the hub, a rotary disk mounted on the axle adjacent to the end of the hub and held against lateral movement on the axle, a second clutch interposed between said disk and the driving-wheel and arranged reversely to the first-named clutch, and a brake member capable of moving lengthwise of the hub and adapted to engage against the same and operated by said rotary disk, substantially as set forth.

2. The combination with an axle and a wheel-hub journaled thereon and provided in one end with a conical brake-surface, of a driving-wheel mounted on the hub and held against lateral movement thereon, a clutch which compels the hub to turn forwardly with the driving-wheel but allows the latter to turn backwardly independently of the hub, a rotary disk mounted on the axle adjacent to the end of the hub and held against lateral movement on the axle, a second clutch interposed between said disk and the driving-wheel and arranged reversely to the first-named clutch, and a brake member movable lengthwise in the end of the hub and operated by said disk and having a conical face adapted to bear against the corresponding surface of the hub, substantially as set forth.

3. The combination of a stationary axle, a wheel-hub journaled thereon and a driving device, of a clutch which compels the hub to turn forwardly with the driving device but allows the driving device to turn backwardly independently of the hub, a rotary brake-disk arranged at the end of the hub and having a screw-threaded connection with the axle, a clutch-disk arranged adjacent to the end of the hub, a second clutch interposed between said clutch-disk and the driving device and arranged reversely to the first-named clutch, and a connection between said brake and clutch disk which compels the brake-disk to turn with the clutch-disk and at the same time allows the brake-disk to move toward and from the clutch-disk, substantially as set forth.

4. The combination with a stationary axle having a left-hand screw-thread, and a wheel-hub journaled thereon, of a driving device, a clutch which compels the hub to turn forwardly with the driving device but allows the latter to turn backward independently of the hub, a brake-disk arranged to engage against the hub and having a screw-threaded opening which engages with the screw-thread of the axle, a clutch-disk arranged adjacent to the end of the hub and confined against longitudinal movement on the axle, a second clutch interposed between said clutch-disk and the driving device and arranged reversely to the first-named clutch, and a connecting projection and socket arranged on said brake and clutch disks, respectively, substantially as set forth.

Witness my hand this 1st day of November, 1898.

AL BURT SIMONS.

Witnesses:
CARL F. GEYER,
ELLA R. DEAN.